United States Patent [19]

Gertisser et al.

[11] 4,288,227
[45] Sep. 8, 1981

[54] BASIC PHENOXAZINE DYESTUFFS

[75] Inventors: Berthold Gertisser, Münchenstein; Beat Henzi, Neuallschwil, both of Switzerland

[73] Assignee: Sandoz Ltd., Basel, Switzerland

[21] Appl. No.: 39,646

[22] Filed: May 16, 1979

Related U.S. Application Data

[63] Continuation-in-part of Ser. No. 837,902, Sep. 29, 1977, abandoned.

[30] Foreign Application Priority Data

Oct. 1, 1976 [CH] Switzerland .................. 12452/76

[51] Int. Cl.³ .................. C09B 19/00; D06P 1/00; D06P 1/52; D06P 3/24
[52] U.S. Cl. ................................ 8/655; 544/74
[58] Field of Search ............ 544/98, 74; 8/177 R, 8/168 A, 177 AB, 178 R, 179, 655

[56] References Cited

U.S. PATENT DOCUMENTS

| | | | |
|---|---|---|---|
| 3,806,504 | 4/1974 | Mundlos et al. | 8/177 R |
| 3,824,074 | 7/1974 | Bugaut et al. | 544/74 |
| 3,828,035 | 8/1974 | Baumann et al. | 8/177 R |
| 3,856,788 | 12/1974 | Corbett et al. | 8/177 R |
| 3,896,117 | 7/1975 | Bugaut et al. | 544/74 |
| 3,912,732 | 10/1975 | Burdeska et al. | 8/177 R |
| 3,928,339 | 12/1975 | Mundlos et al. | 8/177 R |

OTHER PUBLICATIONS

Gertisser et al., Chem. Abstracts, vol. 89, abst. 112163z, (1978), (abst. of Ger. Offen. 2,742,649 pub. 4-06-78).

*Primary Examiner*—John D. Randolph
*Attorney, Agent, or Firm*—Gerald D. Sharkin; Richard E. Vila; Thomas C. Doyle

[57] ABSTRACT

Disclosed is a process for imparting coloration of good light fastness to a substrate comprising or consisting of homo- and co-polymers of acrylonitrile or of dicyanoethylene, or acid modified synthetic polyamide or polyester, which process comprises mass dyeing, dyeing or printing such substrate, employing, as dyestuff, a compound or mixture of compounds of formula I,

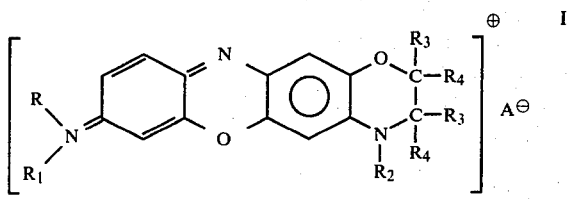

wherein either R is hydrogen, or a straight or branched chain $C_{1-8}$alkyl radical, unsubstituted or mono-substituted by OH, CN, Cl, Br, $CONH_2$, $C_{1-4}$-alkoxy, phenyl, phenoxy, —O—CO—$R_5$ or —CO—O—$R_5$, and $R_1$ is a straight or branched chain $C_{1-8}$alkyl radical, unsubstituted or mono-substituted by OH, CN, Cl, Br, —$CONH_2$, $C_{1-4}$alkoxy, phenyl, phenoxy, —O—CO—$R_5$ or —CO—O—$R_5$; or phenyl, unsubstituted or monosubstituted by halogen, $C_{1-4}$alkyl or $C_{1-4}$alkoxy, or R and $R_1$, together with the nitrogen atom to which they are attached, form a morpholine, piperidine, pyrrolidine, piperazine or N—$C_{1-4}$alkyl-piperazine ring, $R_2$ is hydrogen or a straight or branched chain $C_{1-8}$alkyl radical, unsubstituted or mono-substituted by OH, CN, Cl, Br, —$CONH_2$ or —$COOR_5$, each $R_3$, independently, is hydrogen or unsubstituted $C_{1-4}$alkyl, each $R_4$, independently, is hydrogen, unsubstituted $C_{1-4}$alkyl or unsubstituted phenyl, $R_5$ is unsubstituted $C_{1-4}$alkyl or unsubstituted phenyl, and $A^\ominus$ is an anion, with the proviso that any substituted alkyl as R, $R_1$ or $R_2$ is of at least 2 carbon atoms.

29 Claims, No Drawings

BASIC PHENOXAZINE DYESTUFFS

This application is a continuation-in-part of our co-pending application Ser. No. 837,902, filed Sept. 29, 1977 and now abandoned.

The invention relates to a textile colouration process.

Thus, according to the present invention there is provided a colouration process for a substrate comprising or consisting of homo- and co-polymers of acrylonitrile or of dicyanoethylene, or acid modified synthetic polyamide or polyester, which process comprises mass dyeing, dyeing or printing such substrate, employing, as dyestuff, a compound or mixture of compounds of formula I,

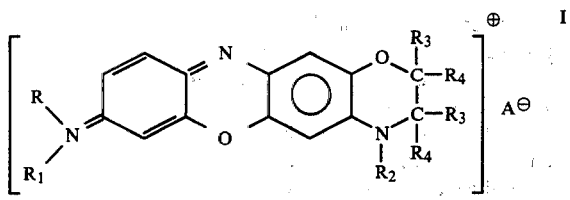

wherein either

R is hydrogen, or a straight or branched chain $C_{1-8}$ alkyl radical, unsubstituted or mono-substituted by OH, CN, Cl, Br, $CONH_2$, $C_{1-4}$-alkoxy, phenyl, phenoxy, —O—CO—$R_5$ or —CO—O—$R_5$, and $R_1$ is a straight or branched chain $C_{1-8}$alkyl radical, unsubstituted or mono-substituted by OH, CN, Cl, Br, —$CONH_2$, $C_{1-4}$ alkoxy, phenyl, phenoxy, —O—CO—$R_5$ or —CO—O—$R_5$; or phenyl, unsubstituted or mono-substituted by halogen, $C_{1-4}$alkyl or $C_{1-4}$alkoxy, or R and $R_1$, together with the nitrogen atom to which they are attached, form a morpholine, piperidine, pyrrolidine, piperazine or N—$C_{1-4}$alkyl-piperazine ring, $R_2$ is hydrogen or a straight or branched chain $C_{1-8}$alkyl radical, unsubstituted or mono-substituted by OH, CN, Cl, Br, —$CONH_2$ or —$COOR_5$, each $R_3$, independently, is hydrogen or unsubstituted $C_{1-4}$alkyl, each $R_4$, independently, is hydrogen, unsubstituted $C_{1-4}$alkyl or unsubstituted phenyl, $R_5$ is unsubstituted $C_{1-4}$alkyl or unsubstituted phenyl, and $A^\ominus$ is an anion, with the proviso that any substituted alkyl as R, $R_1$ or $R_2$ is of at least 2 carbon atoms.

In the compounds of formula I, where R, $R_1$ or $R_2$ are unsubstituted alkyl, they are preferably $C_{1-4}$alkyl, more preferably methyl or ethyl. Any unsubstituted alkyl as $R_3$ or $R_4$ is preferably methyl.

Any halogen substituent or any phenyl as $R_1$ may be fluorine, bromine or chlorine, preferably chlorine.

The preferred significance of R is Ra, i.e. hydrogen, unsubstituted $C_{1-4}$alkyl, 2-cyanoethyl, 2-hydroxypropyl, 2-phenylethyl, 2-carboxamido-ethyl, 2-methoxyethyl, 2-methoxypropyl, 2-benzoyloxyethyl, 2-phenoxyethyl or 2-chloroethyl, or in the formation of a ring with $R_{1a}$, as defined below. The more preferred significance of R is Rb, i.e. hydrogen, methyl or ethyl.

The preferred significance of $R_1$ is $R_{1a}$, i.e. unsubstituted $C_{1-4}$alkyl, 2-cyanoethyl, 2-hydroxyethyl, 2-hydroxypropyl, 2-phenylethyl, 2-carboxamidoethyl, 2-methoxyethyl, 2-methoxypropyl, 2-benzoyloxyethyl, 2-phenoxyethyl, 2-chloroethyl, phenyl, orthotolyl, paratolyl, 4-chlorophenyl or 2-methoxyphenyl, or in the formation of a ring with Ra, as defined below. The more preferred significance of $R_1$ is $R_{1b}$, i.e. methyl, ethyl, phenyl or ortho-tolyl, the most preferred significance being $R_{1c}$, i.e. methyl or ethyl.

Where Ra and $R_{1a}$ form a ring with the nitrogen to which they are attached, such ring is a morpholine, piperidine, pyrrolidine, piperazine or N-methylpiperazine ring.

The preferred significance of $R_2$ is $R_{2a}$, i.e. hydrogen, methyl, ethyl, 2-hydroxyethyl, 2-hydroxypropyl or 2-cyanoethyl, more preferably $R_{2b}$, i.e. hydrogen, methyl or ethyl, most preferably hydrogen.

The preferred significances of each $R_3$ is $R_{3a}$, where each $R_{3a}$ is, independently, hydrogen or methyl, preferably hydrogen.

The preferred significances of each $R_4$ is $R_{4a}$ i.e., independently, hydrogen or methyl, preferably hydrogen.

Thus, as a preferred class of compounds of formula I, for use in the process of the invention, may be given that wherein R is Ra, $R_1$ is $R_{1a}$, $R_2$ is $R_{2a}$, the $R_3$'s are $R_{3a}$'s and the $R_4$'s are $R_{4a}$'s.

As a more preferred class may be given that wherein R is Rb, $R_1$ is $R_{1b}$, $R_2$ is $R_{2b}$ and the $R_3$'s and $R_4$'s are all hydrogen.

As a still further preferred class may be given that when R is Rb, $R_1$ is $R_{1c}$ and $R_2$, the $R_3$'s and $R_4$'s are all hydrogen.

The exact nature of the anion $A^\ominus$ is not critical, it conveniently being any anion conventional in the basic dyestuff art. It is preferably non-chromophoric. As typical examples may be given the halide, e.g. chloride or bromide, sulphate, bisulphate, methylsulphate, aminosulphate, perchlorate, propionate, lactate, succinate, benzenesulphonate, oxalate, malate, maleinate, acetate, tartrate, methanesulphonate, tetrafluoroborate and benzoate anions, as well as complex anions such as of chlorozinc double salts, and anions of the acids boric, citric, glycolic, diglycolic and adipic.

The compounds of formula I may be obtained by reaction of a compound of formula II,

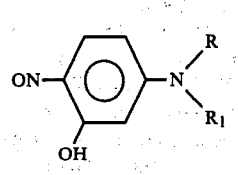

with a compound of formula III,

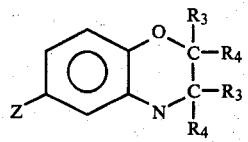

where

Z is —$NR_6R_7$, —$OR_8$ or —O—CO—$R_9$, where $R_6$, $R_7$, $R_8$ and $R_9$, independently, are hydrogen or alkyl, preferably $C_{1-4}$alkyl, in the presence of an acid H-A, where A is an $A^\ominus$ yielding group.

An especially advantageous process involves the in situ formation of the compound of formula II by nitrosylation of a compound of formula IV,

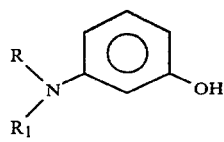

the resulting compound of formula II being further reacted, without isolation, in the same reaction medium, with the compound of formula III and the acid H-A.

The reaction of the compound of formula II with the compound of formula III is suitably carried out under weak acid conditions, e.g. at a pH of about 3, in a protic or aprotic solvent or in a mixture of water and an organic solvent. A suitable reaction temperature is from room temperature to about 130° C., preferably between 30° and 60° C. The following solvents, which where necessary are employed in admixture with water, are particularly suitable, lower molecular, e.g. $C_{1-6}$, primary, secondary or tertiary alcohols, such as methanol, ethanol, propanol, isopropanol or glycol, cyclic ethers, such as dioxan or tetrahydrofuran, mono carboxylic acids, such as formic or acetic acid and acid amides, such as carboxylic acid amides, e.g. N,N-dialkyl acid amides, particularly dimethylformamide, dimethylacetamide and N-methylpyrrolidone. In a preferred embodiment, the solvent employed is an N,N-disubstituted acid amide such as dimethylformamide or dimethylsulphoxide, tetramethylene sulphone or acetonitrile.

The nitrosylation of the compound of formula IV can be carried out in known manner, e.g. employing a nitrite such as sodium nitrite, in aqueous acid medium, optionally in the presence of an organic solvent. A suitable temperature is from 0° to 50° C.

Where the above two processes are carried out together, i.e. without isolation of the compound of formula II, the resulting compounds of formula I are nonetheless obtained in good purity being precipitated from the reaction medium, whilst the impurities generally remain dissolved.

The resulting compounds of formula I may be isolated and purified in conventional manner.

As will be appreciated, employing conventional techniques, interchange of the anion $A^\ominus$ in the resulting compound of formula I, may be effected as desired, e.g. employing an ion exchanger or by treatment with salts and acids, optionally employing two or more steps, e.g. through the hydroxide or bicarbonate.

The compounds of formulae II, III and IV are either known or may be produced in conventional manner from available starting materials.

The compounds of formula I having the formula X

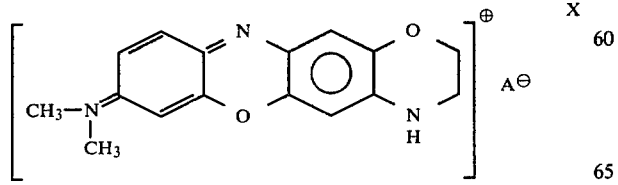

where $A^\ominus$ is as defined above, are new and form a further aspect of the invention.

The substrates to be coloured by the process of the invention are known. Where the substrate does not consist wholly of the polymers and co-polymers mentioned, it may comprise such in blend form, the blends comprising preferably at least 50% by weight of such polymer or co-polymer.

Where the substrate comprises a co-polymer of acrylonitrile, such co-polymer preferably comprises 80–95% of acrylonitrile, the balance 20–5% conveniently being of vinyl acetate, vinyl pyridine, vinyl chloride, vinylidene chloride, acrylic acid, acrylic acid ester, methacrylic acid, methacrylic acid ester or asymmetrical dicyanoethylene.

Where the substrate is of acid modified polyester, such polyester is conveniently that described in U.S. Pat. No. 3,379,723, e.g. synthetic polyester obtained by polycondensation of aliphatic or aromatic carboxylic acids or their ester forming derivatives with compounds bearing anionic groups and with one or more compounds selected from aliphatic and alicyclic diols, aromatic dihydroxy compounds and the glycol ethers of such diols and dihydroxy compounds. As examples of such polyesters may be given the poly-condensation products of adipic, sebacic, terephthalic, isophthalic, naphthalene 2,6-dicarboxylic or diphenyldicarboxylic acids with ethylene glycol, 1,4-bis-(hydroxymethyl)-cyclohexane, neopentyl glycol, diethylene glycol, polyethylene glycol or a compound of formulae (a) or (b).

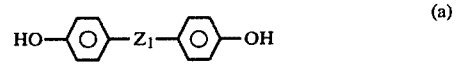

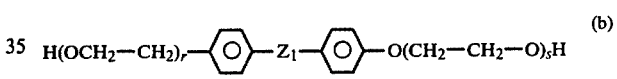

where
Z is a direct bond, $-C(R_o)_2-$, $-CH_2CH_2-$, $-O-$, $-S-$, $-SO_2-$, $-SO-$, or $-NH-$,
$R_o$ is hydrogen or $C_{1-4}$alkyl,
r is a number 0 to 10, and
s is a number 1 to 10,
and with a compound of formula (d),

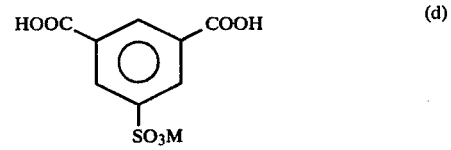

where M is hydrogen or an alkali-metal.

Where the substrate is of acid modified polyamide, such polyamide may, for example be that obtained in analogous manner to the polyester, described above, e.g. by poly-condensation of the above mentioned acids, diols and glycols but with, instead of the compound of formula (d), a diamine of formula (e) or (f),

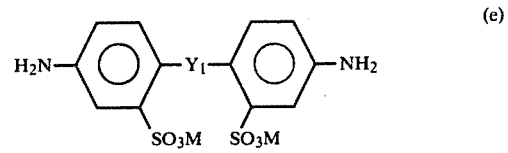

where $Y_1$ is —SO$_2$—, —S—, —O—, or —(CH$_2$)$_n$—, n being a number 1 to 6, and M being as defined above,

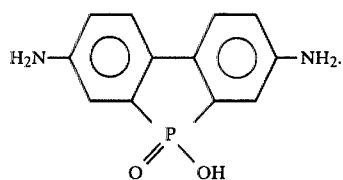 (f)

Further acid modified polyester which may be coloured by the process of the invention is described in U.S. Pat. No. 3,018,272, U.K. patent specification No. 1,406,387 and in Japanese Published Patent Specification No. 10497/59.

Further acid modified polyamide which may be coloured by the process of the invention is described in Belgian patent specification Nos. 549,179 and 706,104, in U.S. Pat. Nos. 2,893,816 and 3,890,257, in "Textilveredlung" 2(1967), 11, pp. 856–864, in "Textilpraxis" 1967, vol. 2, pp. 737–740 and in "Du Pont Preliminary Information" of 14.7.1966, relating to "Type 844 Du Pont DCF Nylon" and of 19.91966, relating to "Cationic Dyeable Nylon Staple".

The mass dyeing, dyeing, or printing of the substrate may be carried out in conventional manner.

For example, dyeing of textile substrates can be carried out as described in German patent specification No. 2,509,095, e.g. by the exhaust method, from an aqueous bath at a temperature of from 60° to 100° C. or at temperatures over 100° under pressure, and over a wide pH range. Alternatively, dyeing can be carried out employing padding techniques, e.g. pad-steam, pad-roll and thermosol techniques. Temperatures above 200° C. are, however, preferably avoided.

The dyebaths and printing pastes employed may, as desired, comprise conventional dyeing or printing aids, e.g. condensation products of naphthalene sulphonic acids and formaldehyde or reaction products of castor oil and ethylene oxide.

Mass dyeing of the substrate may be carried out following gel-dyeing or the so-called "Neocron" process techniques, for example as described in U.K. patent specification No. 673,738.

By the process of the invention, the colouration of the substrate has good fastness properties, e.g. to light.

Where exhaust dyeing is used, the dyestuffs have favourable migration properties; that is, they migrate readily during the exhaust dyeing process, giving rise to level dyeings.

The invention is illustrated by the following Examples, in which all parts and percentages are by weight and the temperatures in degrees centigrade.

Throughout this specification, for the sake of simplicity, the compounds employed in the present invention are shown in only one of their tautomeric forms.

EXAMPLE 1

14 parts of m-dimethylaminophenol were dissolved in 150 parts of dimethylformamide. The solution was cooled to 0° and thereto was added a solution of 6.9 parts sodium nitrite in 8.5 parts water. 25.8 parts of 38% hydrochloric acid were then poured in. A brown-yellow suspension resulted and the temperature rose to 45°. After cooling to 35° the suspension was stirred for 1 hour, the temperature being maintained at 35°. When there was no further evidence of nitrite excess, a solution comprising 22.3 parts of a compound of formula

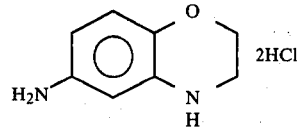

in 50 parts dimethylformamide was added to the suspension and the temperature of the reaction mass raised to 70°, whereupon formation of the blue dyestuff commenced. The reaction mass was stirred for one hour and a part of the dyestuff precipitated. The mixture was then cooled to room temperature, filtered under suction and the residue washed with 50 parts dimethylformamide, followed by 100 parts acetic acid and drying under vacuum at 60° to 70° to give the compound of formula

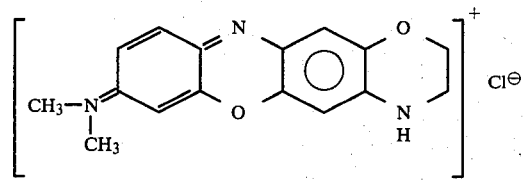

EXAMPLE 2

20 parts of the dyestuff of Example 1 and 80 parts of dextrin are ground in a powder mill for 4 hours. [The same dyestuff mixture may also be obtained by making a paste in 100 parts of water, with subsequent spray drying]. 1 part of the preparation thus obtained is made into a paste with 1 part of 40% acetic acid, the paste is covered with 200 parts of demineralised water and boiled for a short time. It is then diluted with 7000 parts of demineralised water, 2 parts of glacial acetic acid are added and it is entered into a bath at 60° with 100 parts of polyacrylonitrile fabric. [The material may already be pre-treated for 10–15 minutes at 60° in a bath containing 8000 parts of water and 2 parts of glacial acetic acid.] The bath is heated over the course of 30 minutes to 98°–100°, boiled for 1½ hours and the substrate removed and rinsed. A blue dyeing is obtained with good wet and light fastness.

EXAMPLE 3

20 parts of the dyestuff from example 1 are mixed for 48 hours in a ball mill with 80 parts of dextrin; 1 part of the preparation thus obtained is made into a paste with 1 part of the 40% acetic acid, the paste is covered with 200 parts of demineralised water and boiled for a short time. Dyeing takes place as follows using this stock solution.

(a) It is diluted with 7000 parts of demineralised water, then 21 parts of calcined sodium sulphate are added, as well as 14 parts of ammonium sulphate, 14 parts of formic acid and 15 parts of a carrier based on reaction products of ethylene oxide with dichlorophenols, and this is entered into a bath at 60° with 100 parts of acid modified polyester fabric. [The material may already be pre-treated for 10–15 minutes at 60° in a bath containing 8000 parts of water and 2 parts of glacial acetic acid.] The bath is heated over the course of 30 minutes to 98°–100°, then boiled for one hour and the substrate removed and rinsed. An even blue dyeing is obtained with good wet fastness properties.

(b) It is diluted with 3000 parts of demineralised water, then 18 parts of calcined sodium sulphate and formic acid, and this is entered into a bath at 60° with 100 parts of acid modified polyester fabric. Heating takes place in a closed vessel over the course of 45 minutes to 110°, this temperature is maintained for 1 hour with shaking, then the bath is cooled over the course of 25 minutes to 60° and the dyed goods are rinsed. An even blue dyeing is obtained with good wet fastness properties.

(c) The process is the same as for (b), but the closed vessel is heated for 1 hour to 120°.

EXAMPLE 4

20 parts of the dyestuff from example 1 are mixed in a ball mill for 48 hours with 80 parts of dextrin. 1 part of the preparation thus obtained is made into a paste with 1 part of 40% acetic acid, the paste is covered with 200 parts of demineralised water and boiled for a short time. This solution is added to the dye liquor which is prepared in the following way. The solution is diluted with 700 parts of demineralised water, then 21 parts of calcined sodium sulphate are added, as well as 14 parts of ammonium sulphate, 14 parts of formic acid and 15 parts of a carrier based on reaction products of ethylene oxide with dichlorophenols, and the liquor is buffered to a pH value of 6 with an acid buffering solution. It is entered into the bath at 25° with a liquor ratio of 1:80, together with 100 parts of modified polyamide fabric. The bath is heated over the course of 45 minutes to 98°, boiled for one hour and the substrate then removed and rinsed under running water at 70°-80°, and then under cold water. The fabric may be hydro-extracted until dry and then ironed. A blue dyeing with good fastness properties is obtained.

EXAMPLE 5

A printing paste is prepared as follows:

1 part of the dyestuff from example 1 is made into a paste with 30 parts of acetic acid, and then 280 parts of boiling water are poured over the paste. 50 parts of benzyl alcohol and 500 parts of a thickener based on carboxymethyl cellulose, which has been soaked in water in a ratio of 1:4, are added to the solution thus obtained, together with 10 parts of a swelling agent.

A polyacrylonitrile fabric or an acid modified polyester or polyamide fabric is printed in known manner with this printing paste. The prints are dried and given steam treatment in an autoclave at 110° for 30 minutes, and at 1.8 atmospheres; the steam treatment may also be effected continuously for 5 to 30 minutes. After rinsing with cold water, any dyestuff which has not been fixed is removed by washing for 5 minutes at 70° in a 0.1% soap solution; the fabric is then rinsed again with cold water and the print is dried in known manner. A fast, even blue print is obtained with good fastness properties.

In the following table is given the structure of further dyestuffs which may be used to dye or print the substrates given in examples 1–4 by the methods described therein. They correspond to formula

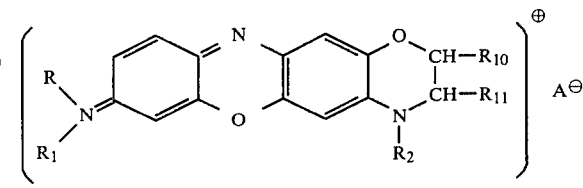

wherein R, $R_1$, $R_2$, $R_{10}$ and $R_{11}$ have the definitions given in the columns. The anions $A^{\ominus}$ may be those listed in the foregoing description.

TABLE 1

| Ex. No. | R | $R_1$ | $R_2$ | $R_{10}$ | $R_{11}$ |
|---|---|---|---|---|---|
| 6 | $C_2H_5$ | $C_2H_5$ | H | H | H |
| 7 | " | $CH_3$ | H | H | H |
| 8 | $C_4H_9$ | $C_4H_9$ | H | H | H |
| 9 | $C_2H_4OH$ | $C_2H_4OH$ | H | H | H |
| 10 | $CH_3$ | $CH_3$ | | | |
| 11 | $CH_2-CH-OH$ | $CH_2-CH-OH$ | H | H | H |
| 12 | $C_2H_4CN$ | $C_2H_4CN$ | H | H | H |
| 13 | $C_2H_5$ | $C_2H_4OH$ | H | H | H |
| 14 | " | $CH_3$ | H | H | H |
|   |   | $CH_2-CH-OH$ |   |   |   |
| 15 | " | $C_2H_4CN$ | H | H | H |
| 16 | " | $C_2H_4Cl$ | H | H | H |
| 17 | " | $C_2H_4COOCH_3$ | H | H | H |
| 18 | " | $C_2H_4CONH_2$ | H | H | H |
| 19 | " | $C_2H_4-OC-CH_3$ | H | H | H |
|   |   | $\parallel$ |   |   |   |
|   |   | O |   |   |   |
| 20 | " | $C_2H_4-OC-\langle O \rangle$ | H | H | H |
|   |   | $\parallel$ |   |   |   |
|   |   | O |   |   |   |
| 21 | " | $C_2H_4-O-CH_3$ | H | H | H |
| 22 | " | $C_2H_4-O-\langle O \rangle$ | H | H | H |
| 23 | " | $C_2H_4-\langle O \rangle$ | H | H | H |
| 24 | $CH_3$ | $C_2H_4OH$ | H | H | H |
| 25 | " | $C_2H_4CN$ | H | H | H |

TABLE 1-continued

| Ex. No. | R | R₁ | R₂ | R₁₀ | R₁₁ |
|---|---|---|---|---|---|
| 26 | H | –C₆H₅ | H | H | H |
| 27 | H | –CH₂–C₆H₅ (CH₃) | H | H | H |
| 28 | H | –C₆H₄–CH₃ | H | H | H |
| 29 | H | –C₆H₄–Cl | H | H | H |
| 30 | H | –C₆H₄–OCH₃ | H | H | H |
| 30 | H | –C₆H₄–OC₂H₅ | H | H | H |
| 31 | CH₃ | –C₆H₅ | H | H | H |
| 32 | " | CH₃ | CH₃ | H | H |
| 33 | C₂H₅ | C₂H₅ | " | H | H |
| 34 | C₂H₄OH | C₂H₄OH | " | H | H |
| 35 | C₂H₄CN | C₂H₄CN | " | H | H |
| 36 | C₂H₅ | C₂H₄OH | " | H | H |
| 37 | " | C₂H₄CN | " | H | H |
| 38 | CH₃ | " | " | H | H |
| 39 | C₂H₅ | C₂H₅ | C₂H₄OH | H | H |
| 40 | " | " | C₂H₄CN | H | H |
| 41 | " | " | C₂H₄COOC₂H₅ | H | H |
| 42 | " | " | CH₂—CH—OH<br>         |<br>        CH₃ | H | H |
| 43 | " | " | C₂H₅ | H | H |
| 44 | " | " | H | CH₃ | H |
| 45 | " | " | H | H | CH₃ |
| 46 | " | " | H | CH₃ | CH₃ |
| 47 | " | " | –C₆H₅ | H | H |
| 48 | H | CH₃ | H | H | H |

EXAMPLE 49

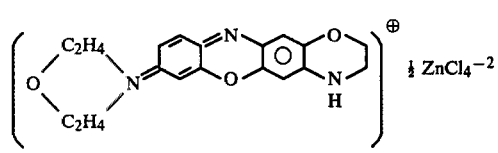

½ ZnCl₄⁻²

EXAMPLE 50

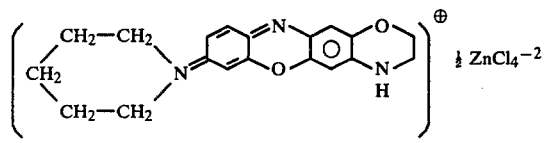

½ ZnCl₄⁻²

The shade of the dyeings on polyacrylonitrile from dyestuffs in examples 6–24, 32–46 and 48–50 is greenish-blue, and in examples 25–31 and 47 is turquoise.

EXAMPLE 51

Following the procedure described in German Published patent specification No. 2,001,748 a solution is prepared of 32 parts of the dyestuff of Example 1 in 68 parts of glacial acetic acid. This mixture is then incorporated in an aqueous thiocyanate solution (see U.K. Pat. Nos. 673,738 and 992,195) at a concentration of 30 g/l and employed in dyeing polyacrylonitrile in continuous wet filament dyeing process according to the gel dyeing procedure set out in Textilveredlung 10 (1975), 2, pp. 63–65 in a conventional wet spin dyeing machine. Blue dyed filaments of acrylonitrile are obtained having notable all-round fastness properties.

The above procedure can be repeated employing any one of the compounds employed in the foregoing Examples 6 to 48.

What is claimed is:

1. A colouration process for a substrate comprising or consisting of homo- and co-polymers of acrylonitrile or of dicyanoethylene, or acid modified synthetic polyamide or polyester, which process comprises mass dyeing, dyeing or printing such substrate, employing a dyestuff or mixture of dyestuffs of formula I,

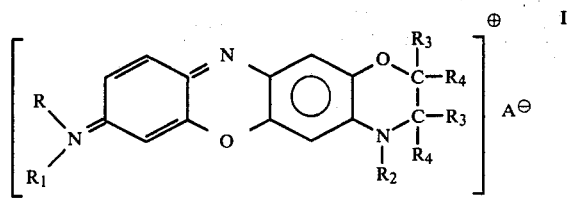

wherein either

R is hydrogen, or a straight or branched chain $C_{1-8}$alkyl radical, unsubstituted or mono-substituted by OH, CN, Cl, Br, $CONH_2$, $C_{1-4}$-alkoxy, phenyl, phenoxy, —O—CO—$R_5$ or —CO—O—$R_5$, and $R_1$ is a straight or branched chain $C_{1-8}$alkyl radical, unsubstituted or mono-substituted by OH, CN, Cl, Br, —$CONH_2$, $C_{1-4}$alkoxy, phenyl, phenoxy, —O—CO—$R_5$ or —CO—O—$R_5$; or phenyl, unsubstituted or monosubstituted by halogen, $C_{1-4}$alkyl or $C_{1-4}$alkoxy, or R and $R_1$, together with the nitrogen atom to which they are attached, form a morpholine, piperidine, pyrrolidine, piperazine or N—$C_{1-4}$alkyl-piperazine ring, $R_2$ is hydrogen or a straight or branched chain $C_{1-8}$alkyl radical, unsubstituted or mono-substituted by OH, CN, Cl, Br, —$CONH_2$ or —$COOR_5$, each $R_3$, independently, is hydrogen or unsubstituted $C_{1-4}$alkyl, each $R_4$, independently, is hydrogen, unsubstituted $C_{1-4}$alkyl or unsubstituted phenyl, $R_5$ is unsubstituted $C_{1-4}$alkyl or unsubstituted phenyl, and $A^{\ominus}$ is an anion, with the proviso that any substituted alkyl as R, $R_1$ or $R_2$ is of at least 2 carbon atoms.

2. The process of claim 1, wherein in the compound of formula I, R is hydrogen, unsubstituted $C_{1-4}$alkyl, 2-cyanoethyl, 2-hydroxypropyl, 2-phenylethyl, 2-carboxamidoethyl, 2-methoxyethyl, 2-methoxypropyl, 2-benzoyloxyethyl, 2-phenoxyethyl or 2-chloroethyl or, together with $R_1$, forms a morpholine, piperidine, pyrrolidine, piperazine or N-methyl-piperazine ring.

3. The process of claim 2, wherein, in the compound of formula I, R is hydrogen, methyl or ethyl.

4. The process of claim 1, wherein, in the compound of formula I, $R_1$ is unsubstituted $C_{1-4}$alkyl, 2-cyanoethyl, 2-hydroxyethyl, 2-hydroxypropyl, 2-phenylethyl, 2-carboxamidoethyl, 2-methoxyethyl, 2-methoxypropyl, 2-benzoyloxyethyl, 2-phenoxyethyl, 2-chloroethyl, phenyl, orthotolyl, paratolyl, 4-chlorophenyl or 2-methoxyphenyl or, together with R, forms a morpholine, piperidine, pyrrolidine, piperazine or N-methyl-piperazine ring.

5. The process of claim 4, wherein in the compound of formula I, $R_1$ is methyl, ethyl, phenyl or orthotolyl.

6. The process of claim 5, wherein in the compound of formula I, $R_1$ is methyl or ethyl.

7. The process of claim 1, wherein in the compound of formula I, $R_2$ is hydrogen, methyl, ethyl, 2-hydroxyethyl, 2-hydroxypropyl or 2-cyanoethyl.

8. The process of claim 7, wherein, in the compound of formula I, $R_2$ is hydrogen, methyl or ethyl.

9. The process of claim 8, wherein, in the compound of formula I, $R_2$ is hydrogen.

10. The process of claim 1, wherein in the compound of formula I, $R_3$ is hydrogen or methyl.

11. The process of claim 10, wherein, in the compound of formula I, $R_3$ is hydrogen.

12. The process of claim 1, wherein, in the compound of formula I, $R_4$ is hydrogen or methyl.

13. The process of claim 12, wherein, in the compound of formula I, $R_4$ is hydrogen.

14. The process of claim 1, wherein the compound of formula I is a compound of formula X,

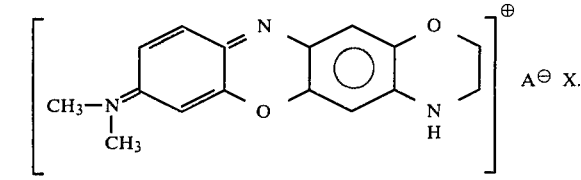

15. The process of claim 1, wherein the compound of formula I is a compound

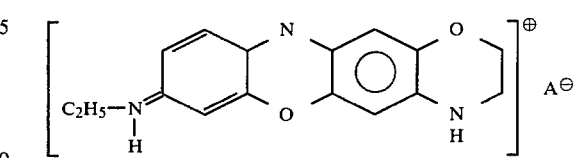

16. The process of claim 1, wherein the compound of formula I is a compound

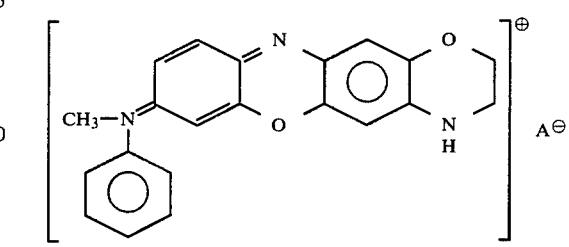

17. The process of claim 1, wherein the compound of formula I is a compound

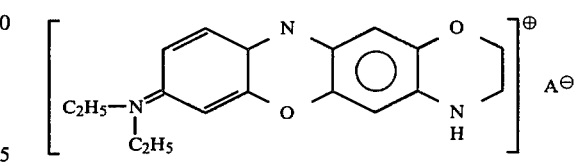

18. The process of claim 1, wherein, in the compound of formula I, R and $R_1$ have a significance other than the formation of a ring.

19. The process of claim 1, wherein, in the compound of formula I, R and $R_1$, together with the nitrogen atom to which they are attached, form a ring.

20. The process of claim 1, wherein the substrate is a textile substrate, said substrate being dyed or printed by the application thereto of a dyeing liquor or printing paste comprising a compound of formula I.

21. The process of claim 20, wherein the substrate comprises or consists of fibres or filaments of homo- or co-polymer of polyacrylonitrile.

22. The process of claim 20, wherein the substrate comprises or consists of fibres or filaments of acid modified synthetic polyamide or polyester.

23. The process of claim 1, wherein said substrate is dyed in the mass.

24. A compound of the formula

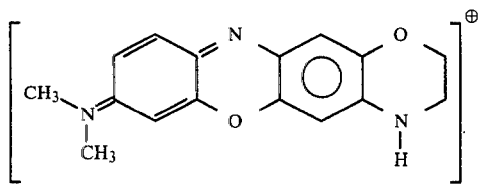

wherein A⊖ is an anion.

25. A compound according to claim 24 wherein A⊖ is a non-chromophoric anion.

26. A compound according to claim 24 wherein A⊖ is halide, sulphate, bisulphate, methylsulphate, aminosulphate, perchlorate, propionate, lactate, succinate, benzenesulphonate, oxalate, malate, maleinate, acetate, tartrate, methanesulphonate, tetrafluoroborate or benzoate or an anion of a chlorozinc double salt or of boric, citric, glycolic, diglycolic or adipic acid.

27. A process according to claim 20 wherein the substrate is dyed from an aqueous bath by the exhaust dyeing method.

28. A process according to claim 1 wherein
R is hydrogen, unsubstituted $C_{1-4}$alkyl, 2-cyanoethyl, 2-hydroxypropyl, 2-phenylethyl, 2-carboxamidoethyl, 2-methoxyethyl, 2-methoxypropyl, 2-benzoyloxyethyl, 2-phenoxyethyl or 2-chloroethyl or, together with $R_1$, forms a morpholine, piperidine, pyrrolidine, piperazine or N-methyl-piperazine ring,
$R_1$ is unsubstituted $C_{1-4}$alkyl, 2-cyanoethyl, 2-hydroxyethyl, 2-hydroxypropyl, 2-phenylethyl, 2-carboxamidoethyl, 2-methoxyethyl, 2-methoxypropyl, 2-benzoyloxyethyl, 2-phenoxyethyl, 2-chloroethyl, phenyl, orthotolyl, paratolyl, 4-chlorophenyl or 2-methoxyphenyl or, together with R, forms a morpholine, piperidine, pyrrolidine, piperazine or N-methyl-piperazine ring,
$R_2$ is hydrogen, methyl, ethyl, 2-hydroxyethyl, 2-hydroxypropyl or 2-cyanoethyl,
$R_3$ is hydrogen or methyl, and
$R_4$ is hydrogen or methyl.

29. A process according to claim 1 wherein
R is hydrogen, methyl or ethyl,
$R_1$ is methyl, ethyl, phenyl or orthotolyl,
$R_2$ is methyl, ethyl, and $R_3$ and $R_4$ are hydrogen.

* * * * *